W. C. MORTENSEN.
ELECTRIC HEATING DEVICE.
APPLICATION FILED APR. 6, 1908.
900,295.
Patented Oct. 6, 1908.
2 SHEETS—SHEET 1.
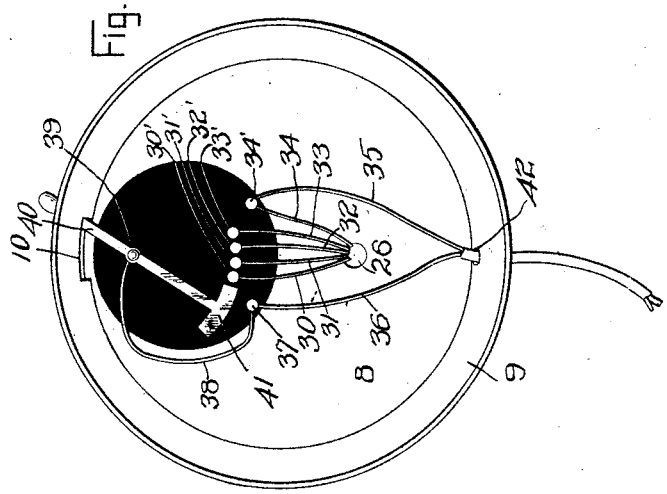
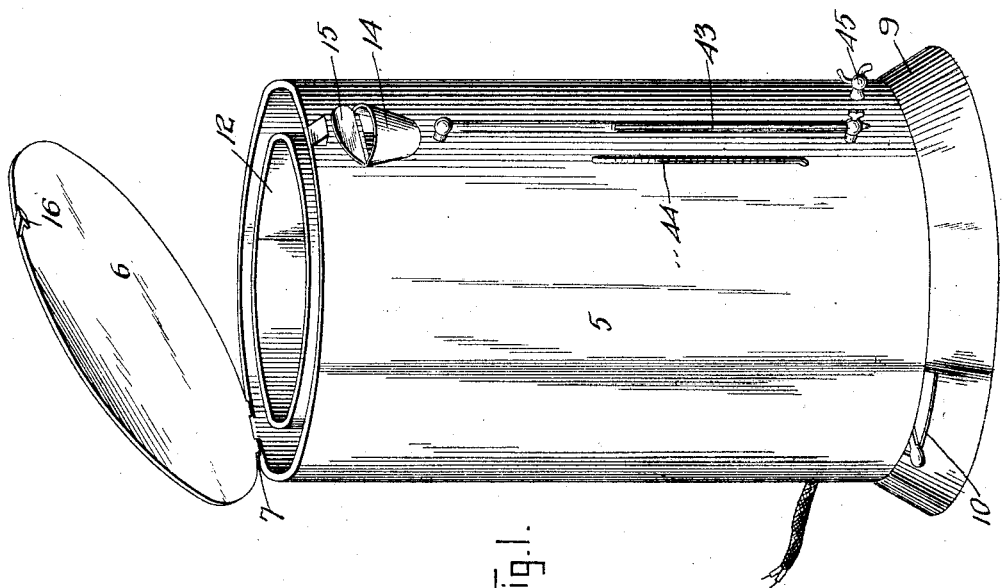
Witnesses
E. K. Reichenbach
M. J. Miller
Inventor
William C. Mortensen
By 
Attorneys

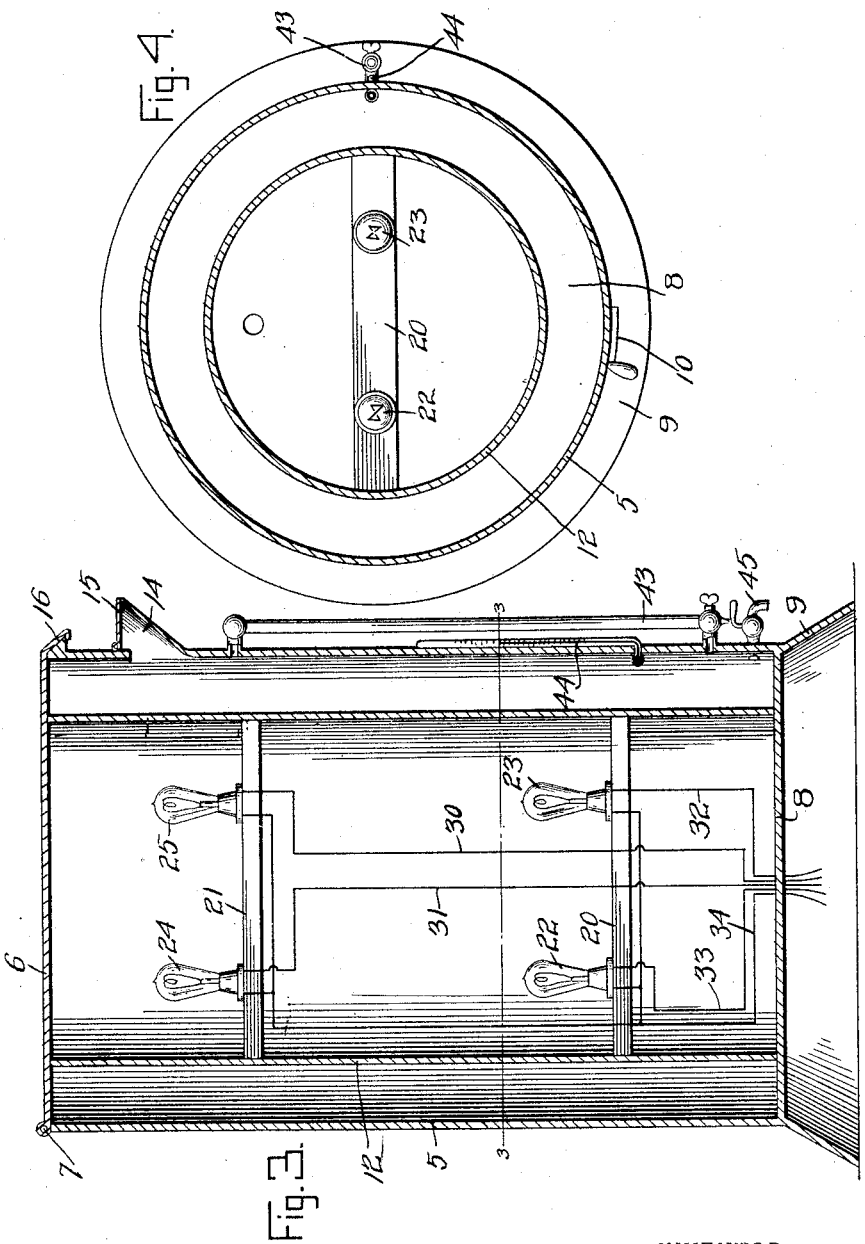

UNITED STATES PATENT OFFICE.

WILLIAM C. MORTENSEN, OF SALT LAKE CITY, UTAH, ASSIGNOR OF ONE-HALF TO JOSEPH R. HARRIS, OF WOODRUFF, IDAHO.

ELECTRIC HEATING DEVICE.

No. 900,295.    Specification of Letters Patent.    Patented Oct. 6, 1908.

Application filed April 6, 1908. Serial No. 425,523.

*To all whom it may concern:*

Be it known that I, WILLIAM C. MORTENSEN, a citizen of the United States, residing at Salt Lake City, in the county of Salt Lake, State of Utah, have invented certain new and useful Improvements in Electric Heating Devices; and I do hereby declare the following to be a full, clear, and exact description of the invention, such as will enable others skilled in the art to which it appertains to make and use the same.

This invention relates to certain new and useful improvements in heating urns.

The object of my invention is, to provide an urn constructed so that a liquid contained therein may be kept at a desired temperature.

In the accompanying drawings I have shown in Figure 1 a perspective view of an urn embodying my invention with the lid partly opened. Fig. 2 is a bottom view. Fig. 3 is a vertical section, and Fig. 4 is a horizontal sectional view, of an urn embodying my invention.

This invention relates to an electrically heated urn in which certain beverages such as tea, coffee and the like, may be kept at a certain predetermined temperature, so that the fluid may be drawn from the urn, at all times at the desired temperature, the device being so constructed that the temperature of the urn contents may be raised or lowered.

In carrying out the aim of my invention, I employ a cylindrical vessel or receptacle 5 provided above with a lid 6 supported by means of a hinge 7. This vessel is provided with the bottom 8 and the outwardly flared base flange 9. This base flange at its forward upper edge is provided with the slot 10. Held within this receptacle is an open ended cylinder 12, this cylinder being secured to the bottom 8 as disclosed in Fig. 3.

Near its upper end the urn is provided with the spout 14 covered by means of a suitable lid 15 and it is through this spout that the urn is filled when the lid 6 is closed, this lid being provided with the clasp 16 to properly retain this lid. Held within the cylinder 12 which forms a hot air chamber are the two lamp supporting bars 20 and 21, the lower bar being provided with the lamps 22 and 23 while the upper bar is provided with the lamps 24 and 25.

Through the central portion of the bottom 8 is formed an opening 26 through which pass the circuit wires including the individual feeders 30, 31, 32 and 33 and the common return 34. The wires 30, 31, 32 and 33 are connected respectively with contact points 30', 31', 32' and 33', while the common return 34 is connected with the binding post 34' to which is also connected a leading in wire 35. A second leading in wire 36 is connected with a binding post 37 to which in turn is connected a wire 38 leading to the pivot 39 and a switch lever 40 having an enlarged head 41, said switch being so pivoted that it may be swung to engage its head with the contacts 30, 31, 32 and 33 successively, the head being of sufficient breadth to engage the entire number of contacts at one time, thus to cut one, two, three or the entire number of lamps into circuit with the leading in wires. The leading in wires pass through an opening 42 conveniently formed in the flange 9. Thus, it will be seen that there is provided means for contributing a varying degree of heat to the apparatus.

Communicating with the interspace between the body 5 of the urn and the interior cylindrical wall 12, is a common form of gage glass 43 while a thermometer 44 is disposed with its lower bulbed end projecting inwardly through the wall of the body 5. A faucet 45 is provided for drawing off the contents of the liquid heat chamber or interspace between the walls above referred to.

What is claimed is—

An urn of the class described, comprising a cylindrical vessel having a lower slotted flange, an open ended cylinder secured to the bottom of said vessel to form a heating chamber, a lid to close said vessel and chamber, an upper and a lower lamp supporting bar within said chamber, electric lamps secured to said bars, a switch pivoted to the under-surface of said urn having an operating handle extending through said slot, an electric terminal for each lamp in the path of said switch, conductors connecting said lamps and terminals, and conductors within a suitable circuit connected to said lamps and switch all arranged as set forth.

In testimony whereof, I affix my signature, in presence of two witnesses.

WILLIAM C. MORTENSEN.

Witnesses:
W. V. JONES,
J. E. KING.